Oct. 21, 1969     E. L. SCHMITT     3,473,831
FLANGE COUPLING HAVING MOVABLE SUPPORT MEMBERS
Filed May 3, 1968
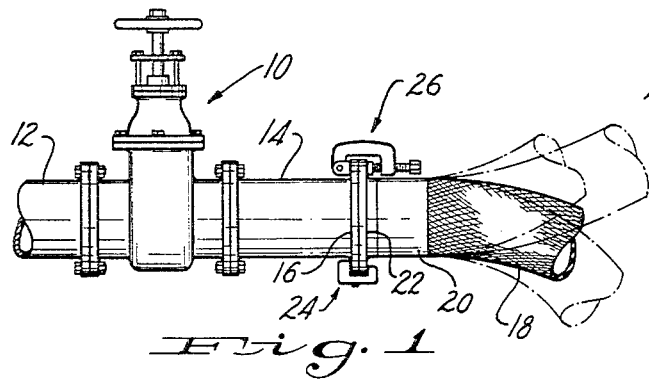
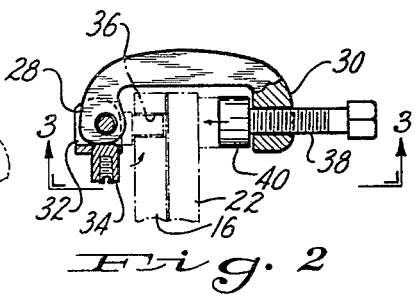
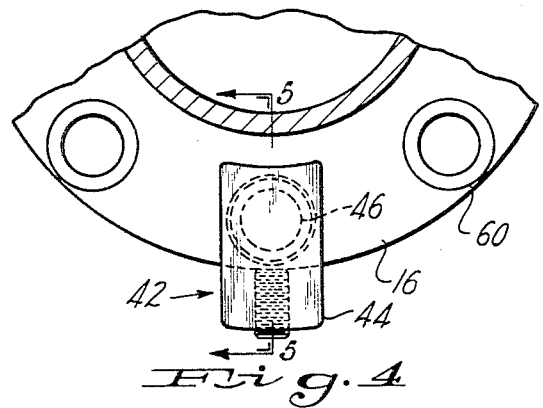
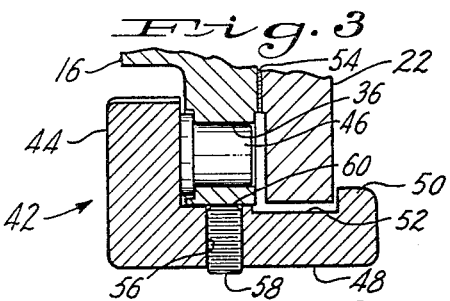
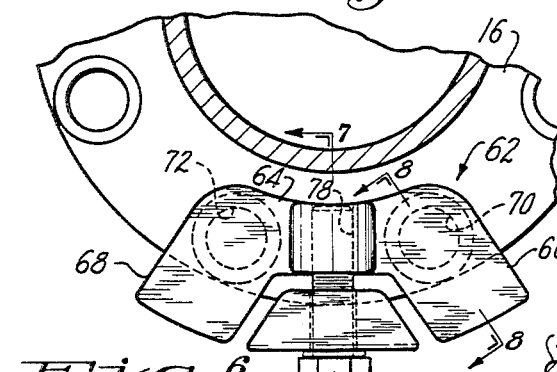
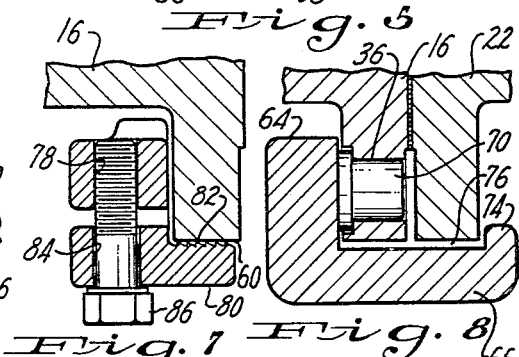
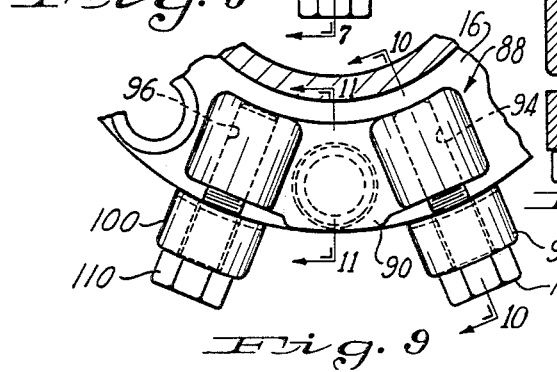
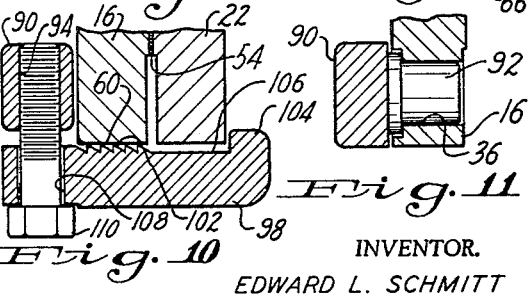
INVENTOR.
EDWARD L. SCHMITT
BY
Stanley J. Price
his ATTORNEY

United States Patent Office 3,473,831
Patented Oct. 21, 1969

3,473,831
FLANGE COUPLING HAVING MOVABLE SUPPORT MEMBERS
Edward L. Schmitt, Pittsburgh, Pa., assignor to Kerotest Manufacturing Corporation, Pittsburgh, Pa., a corporation of Pennsylvania
Filed May 3, 1968, Ser. No. 726,449
Int. Cl. F16l *23/00, 3/00, 57/00*
U.S. Cl. 285—24                                4 Claims

ABSTRACT OF THE DISCLOSURE

This disclosure relates to a flange coupling device for connecting the flanges of a relatively flexible hose and a fixed rigid pipe or valve. The flange coupling includes one or more C-clamp members with a yoke member pivotally connected to one arm of the C-clamp and a bolt member threaded through an opening in the other end of the C-clamp. The yoke member is secured in a bolt hole of the fixed flange and the C-clamp is pivoted to a position over both the fixed flange and the movable flange of the flexible hose. The bolt member is moved into abutting relation with the movable flange and urges the movable flange into abutting relation with the fixed flange. Movable supporting members are connected to the fixed flange at preselected locations about the circumference of the fixed flange. The preselected location of the supporting members on the fixed flange is dependent on the angular displacement of the flange on the flexible hose relative to the flange on the fixed pipe or valve. The movable supporting members have a body portion with one or more laterally extending pin members that extend into preselected bolt holes that are regularly spaced on the fixed flange in a circular configuration. Arm members, either formed integrally with or secured to the body portion have an inturned end portion and form supporting arms for the movable flange. A locking device secures the body portion to the peripheral wall of the fixed flange.

BACKGROUND OF THE INVENTION

Field of the invention

This invention relates to a flange coupling device with movable support members and more particularly to a flange coupling device that has separate support members and clamping members positionable at preselected locations around the periphery of one of the flanges.

Description of the prior art

United States Patent 3,191,969 entitled "Flange Coupling" discloses a C-clamp type coupling device for connecting the mating flanges of a rigid or fixed pipe or valve and a flexible hose or conduit. The valve or rigid pipe flange has three supporting lugs extending laterally from the peripheral edge portion in the lower quadrant of the flange. The movable flange of the flexible conduit is first wedged between the inturned end portion of the supporting lugs and the fixed flange. The movable flange is then pivoted into abutting mating relation with the fixed flange. C-clamp type coupling devices then secure the movable flange to the fixed flange at locations substantially diametrically opposite to the fixed supporting lugs. The flange coupling device provides a quick coupling to couple flexible hoses to a fixed conduit or valve, and operates efficiently with relatively flexible hoses or where the longitudinal axis of the hose is aligned with or extends downwardly from the longitudinal axis of the valve or fixed conduit. Where the hoses are large and unwieldy, and the longitudinal axis of the hose extends angularly upwardly or to the sides of the longitudinal axis of the valve or fixed conduit, considerable difficult is encountered in positioning the flange faces in abutting relation for connecting the flanges to each other.

SUMMARY OF THE INVENTION

The hereinafter described invention comprises an improvement on the flange coupling described in United States Patent 3,191,969 in that the improved flanged coupling includes lug or support members that may be positioned at preselected locations around the periphery of the fixed flange. The support members include pin means extending into one or more of the bolt apertures in the fixed flange and locking means that secure the support member to the peripheral edge of the fixed flange. The support members are positioned at a location on the fixed flange to receive an edge portion of the movable flange so that the inturned end portion of the support member serves in a manner similar to a fulcrum for the movable flange and the movable flange may be readily pivoted into abutting relation with the fixed flange.

Accordingly, the principal object of this invention is to provide a flange coupling with a support member positionable at preselected locations about the periphery of one of the flanges.

Another object of this invention is to provide a flange coupling for a fixed flange that has a support member that engages an edge portion of the movable flange when the movable flange is angularly displaced from the fixed flange.

These and other objects and advantages of this invention will be more completely disclosed and described in the following specification, the accompanying drawings and the appended claims.

BRIEF DESCRIPTION OF THE DRAWINGS

FIGURE 1 is a view in side elevation of my flange coupling connecting the flange portion of a flexible hose with a flange of a fixed sleeve connected to a valve. Certain of the relative angular positions of the flexible hose are illustrated in dash-dot lines in FIGURE 1.

FIGURE 2 is a fragmentary view partially in section illustrating the C-clamp portion of the flange coupling.

FIGURE 3 is a view taken along the line 3—3 of FIGURE 2 illustrating the yoke structure of the C-clamp.

FIGURE 4 is a fragmentary view in end elevation of the fixed flange with one embodiment of the movable support member connected thereto.

FIGURE 5 is a view in section taken along the line 5—5 in FIGURE 4 illustrating in detail the construction of the movable support member illustrated in FIGURE 4.

FIGURE 6 is a view similar to FIGURE 4 illustrating another embodiment of my movable support member.

FIGURE 7 is a view in section taken along the line 7—7 of FIGURE 6 illustrating the securing means for the support member illustrated in FIGURE 6.

FIGURE 8 is a view in section taken along the line 8—8 of FIGURE 6 illustrating one of the pin members of the supporting member illustrated in FIGURE 6 positioned in a bolt hole.

FIGURE 9 is a view similar to FIGURES 4 and 6 illustrating another embodiment of my movable support member.

FIGURE 10 is a view in section taken along the line 10—10 of FIGURE 9 illustrating one of the arm members connected to the support member body portion.

FIGURE 11 is a view in section taken along the line 11—11 of FIGURE 9 illustrating the manner in which the pin member is positioned in the bolt hole.

DESCRIPTION OF THE PREFERRED EMBODIMENTS

Referring to the drawings and particularly to FIGURE 1, there is illustrated a valve member 10 coupled to a first fixed conduit 12. The other end of the valve member is connected to a sleeve 14 that has an end flange 16. The sleeve 14 is connected to the flanged end portion of the valve 10 in a conventional manner by bolts extending through aligned bolt holes in the abutting flanges on valve 10 and sleeve 14. The conduit 12 with the valve 10 connected thereto may be a conduit for a tank type storage means.

A relatively flexible hose 18 has an end portion 20 with a flange 22 thereon. The flexible hose 18 may be connected at the other end to a liquid transporting device such as an ocean going vessel, barge or the like. Depending on the position of the vessel relative to the fixed conduit 12, the longitudinal axis of the flexible hose 18 may extend angularly to the longitudinal axis of the fixed conduit 12 and sleeve 14. For example, where the vessel is below the fixed conduit 12, the flexible hose 18 will extend angularly upwardly toward the fixed conduit 12 and the end portion of the hose must be bent downwardly to align and position the hose flange 22 in abutting overlying relation with the fixed sleeve flange 16. Similarly, when the vessel is displaced laterally from the fixed conduit 12, the end portion of the flexible hose 18 must be bent or deflected to position the hose flange 22 in abutting overlying relation with the fixed flange 16.

Where the hose is of substantially large diameter, i.e. 8" or greater, substantial difficulty is encountered in deflecting or bending the flexible portion of the hose to align the hose flange 22 with the fixed flange 16. By first positioning a portion of the flange 22 in a support member generally designated by the numeral 24 in FIGURE 1, and then using a portion of the support member as a fulcrum about which the hose flange 22 is pivoted into abutting relation with the fixed sleeve flange 16, the connecting or coupling of the flanges 22 and 16 is simplified. The flange having the support member secured thereto will also be referred to for convenience as a support flange.

The flange coupling includes a plurality of C-clamp members 26 that have a pair of spaced arm portions 28 and 30. A yoke member 32 is pivotally secured to the arm member 28 and has a pin member 34 that is secured in a bolt hole 36 of the fixed flange 16. The C-clamp other arm 30 has a threaded bolt 38 with an enlarged head portion 40. The C-clamp 26 is arranged to span the mating flanges 16 and 22 and the enlarged portion 40 of bolt 38 is arranged to urge the respective flanges 16 and 22 into abutting relation with each other. A suitable C-clamp is illustrated and described in United States Patent 3,191,969. It should be noted that the C-clamps 26 are removably secured to the fixed flange 16 by positioning the pin member 34 in any of the regularly spaced bolt holes that extend around the flange 16 in a circular configuration. Thus, the C-clamp 26 may be positioned in the lower quadrant of the flange 16, the upper quadrant of the flange 16 or either of the side quadrants of the flange 16.

Referring to FIGURES 4 and 5, there is illustrated one embodiment of my movable support member generally designated by the numeral 42 secured to the fixed flange 16 of sleeve 14. Although FIGURE 4 is a fragmentary view illustrating the support member 42 connected in the lower quadrant of the fixed flange 16, it will be appreciated that the support member may be positioned at any location around the periphery of the fixed flange 16 depending on the relative location of the movable flange 22 so that the support member may be utilized to assist in supporting the movable flange 22 while the hose 18 is deflected or bent to position the flange 22 in abutting relation with the fixed flange 16.

The support member 42 has a body portion 44 with a pin member 46 extending laterally therefrom. The pin member 46 extending laterally preselected bolt hole 36 to fix the relative position of the support member 42 on the flange 16. The body portion 44 has an arm member 48 extending laterally therefrom in substantially parallel relation with the pin member 46. The arm member 48 has an upturned end portion 50 to form a receiving recess 52 for the flange 22 of the flexible hose 18. The arm 48 is dimensioned so that the recess 52 is slightly larger than the width of the flange 22. A gasket member 54 may be positioned between the respective flanges and within the recess 52 where desired. The body portion has a radially extending threaded aperture 56 with a screw 58 positioned therein. The screw 58 is arranged to abut the peripheral edge 60 of flange 16 and fixedly secure the support member 42 to the flange 16.

The screw 58 urges the arm member 48 away from the flange 16 and wedges the pin member 46 in the bolt hole 36 to rigidly secure the support member 42 on the flange 16. It will be appreciated that the support member 42 may be removed from the flange 16 by loosening the screw 58 and removing the pin 46 from the bolt hole 36. Thus, the support member 42 may be quickly removed and positioned at relative locations along the periphery of the flange 16 depending on the relative position and angular deflection of the flexible hose 18. The C-clamps 26 may also be quickly removed and positioned on the flange 16 at locations substantially diametrically opposed to the support members 42. Although in FIGURES 4 and 5, only a single support member 42 is illustrated, it should be understood that one or more of the support members 42 may be used with the flange coupling.

In FIGURES 6, 7 and 8, another embodiment of my movable support member is illustrated. In these figures, the movable support member is generally designated by the numeral 62 and has a body portion 64 with a pair of laterally extending arm members 66 and 68. The body portion 64 has a pair of pin members 70 and 72 extending laterally therefrom at a location above the arm members 66 and 68. The pin members 70 and 72 are arranged to be positioned in adjacent bolt holes 36 on the flange 16 with the arm portions 66 and 68 extending beyond the flange 16. The arms 66 and 68 both have an upturned end portion 74 forming recessed receiver portions 76 for the movable flange 22. The body portion 64 has a radially extending threaded aperture 78 between the pin members 70 and 72. A locking lug 80 has a serrated edge portion 82 and a radially extending aperture 84 that is aligned with the threaded aperture 78 in the body portion 64. The lug 80 is positioned with the serrated edge portion 82 abutting the peripheral edge 60 and a bolt 86 extends through the aligned apertures 84 and 78 and secures the movable support member 62 to the flange member 16. With the embodiment illustrated in FIGURES 6, 7 and 8, the pin members 70 and 72 are spaced from each other the same distance as the bolt holes on the flange 16 and are thus arranged to be affixed to flange members of preselected size with the preselected bolt hole spacing. With the embodiment illustrated in FIGURES 6, 7 and 8, the support member 62 may be quickly removed from the flange 16 and placed at any preselected location around the peripheral edge of the flange 16 to receive the flange 22 in the recessed portion 76 to thus assist in moving the flange 22 into abutting relation with the flange 16.

Referring to FIGURES 9, 10 and 11, a third embodiment of my movable support member is illustrated. In this embodiment, the movable support member is generally designated by the numeral 88 and has a body portion 90 with a pin member 92 extending laterally therefrom intermediate the end portions. The pin member 92 is arranged to be positioned in any one of the bolt holes 36 in flange 16. The body portion 90 has a pair of radially extending threaded apertures 94 and 96 on opposite sides of the pin member 92. A pair of arm members 98 and 100 have serrated intermediate portion 102 arranged to abut the peripheral edge portion 60 of flange 16. The arm members each have an upturned end portion 104 forming a receiving recess 106 for the flange 22. The other end of the arm member 98 has a radially extending aperture 108 through which a bolt 110 extends and is threadedly secured in the threaded aperture 94 in the body portion 90. The arm member 100 is of similar construction so that the support member 88 is rigidly secured to the flange member 16 by urging the serrated portions 102 of arm members 98 and 100 against the periphery 60 of flange 16. The pin member 92 is positioned between the arm members 98 and 100 and maintains the support member in fixed position at a predetermined location along the periphery of the flange member 16. The support member 88 may be quickly removed from the flange 16 by disengaging the arm members 98 and 100 from the peripheral edge portion of the flange and removing the pin member 92 from the bolt hole 36. With the embodiment illustrated in FIGURES 9, 10 and 11, the movable support member 88 can be used with flange members of different diameters with different bolt hole spacing.

Although the support members have been described as being secured to the fixed sleeve flange 16, it should be understood that the support members may be secured to the hose flange 22 in a preselected quadrant and assist in coupling the flanges 16 and 22 together.

According to the provisions of the patent statutes, the principle, preferred construction and mode of operation of this invention have been explained and what is considered to represent its best embodiments have been illustrated and described.

I claim:
1. In a flange coupling for pipe including,
a fixed flange and a movable flange,
at least one of said flanges having regularly spaced holes in a circular pattern adjacent the periphery of said flange,
yoke members secured in certain of said regularly spaced holes,
C-clamp members pivotally secured at one leg to each yoke and adapted to pivot over said fixed flange and said movable flange with a leg on each opposite side of said flanges,
screw means in the other leg of the C-clamp members movable on an axis of the bolt hole to exert pressure between the legs of said C-clamp members on the flanges to urge said flanges together,
the improvement comprising,
a flange support member having a body portion with laterally extending pin means,
said pin means positioned in at least one preselected hole in one of said flanges serving as a support flange, said pin means having an axial length no greater than the thickness of said support flange,
arm means extending laterally from said body portion and having an upturned end portion, and
locking means rigidly securing said flange support member to said support flange, said support member operable to receive and support an edge portion of said other flange upon angular displacement of said other flange relative to said support flange so that said other flange may be pivoted in said support member into overlying relation with said support flange.

2. A flange coupling as set forth in claim 1 in which,
said support member includes a body portion with a pair of pin members extending laterally therefrom,
said pin members positioned in adjacent spaced holes in said support flange,
a pair of arm members extending from said body portion beyond the periphery of said support flange, said arm members having upturned edge portions,
said body portion having a radially extending threaded passageway,
a locking member positioned in abutting relation with said support flange peripheral edge between said pin members,
said locking member having a passageway therethrough aligned with said body portion passageway, and
bolt means extending through said aligned passageways and securing said supporting member to said support flange.

3. A flange coupling as set forth in claim 1 in which,
said support member includes a body portion having a laterally extending pin member,
said pin member positioned in one of said holes in said support flange,
said body portion having a pair of radially extending threaded passageways on opposite sides of said pin member,
a pair of arm members abutting the peripheral edge of said support flange on opposite sides of said pin member,
said arm members having upturned edge portions and radially extending passageways aligned with said threaded passageway in said body member, and
bolt means extending through said passageways and securing said arm members to said flange peripheral edge portion and to said support member body portion.

4. A flange coupling as set forth in claim 1 in which,
said support member includes a body portion having a laterally extending pin member,
said pin member positioned in one of said holes in said support flange,
said body portion having a laterally extending arm member abutting the periphery of said support flange and having an upturned end portion,
said arm member having a radially extending threaded bore in overlying relation with said support flange peripheral edge portion, and
a locking member threadedly positioned in said bore and abutting said support flange peripheral edge portion to secure said support member to said support flange.

References Cited

UNITED STATES PATENTS

| 2,478,487 | 8/1949 | Katzenmeyer et al. | 285—364 X |
| 2,761,703 | 9/1956 | Olwin | 285—364 X |
| 3,191,969 | 6/1965 | Wrenshall | 285—320 X |

FOREIGN PATENTS

| 668,745 | 7/1929 | France. |
| 540,116 | 12/1931 | Germany. |

THOMAS F. CALLAGHAN, Primary Examiner

U.S. Cl. X.R.

285—320, 364